Patented Feb. 28, 1950

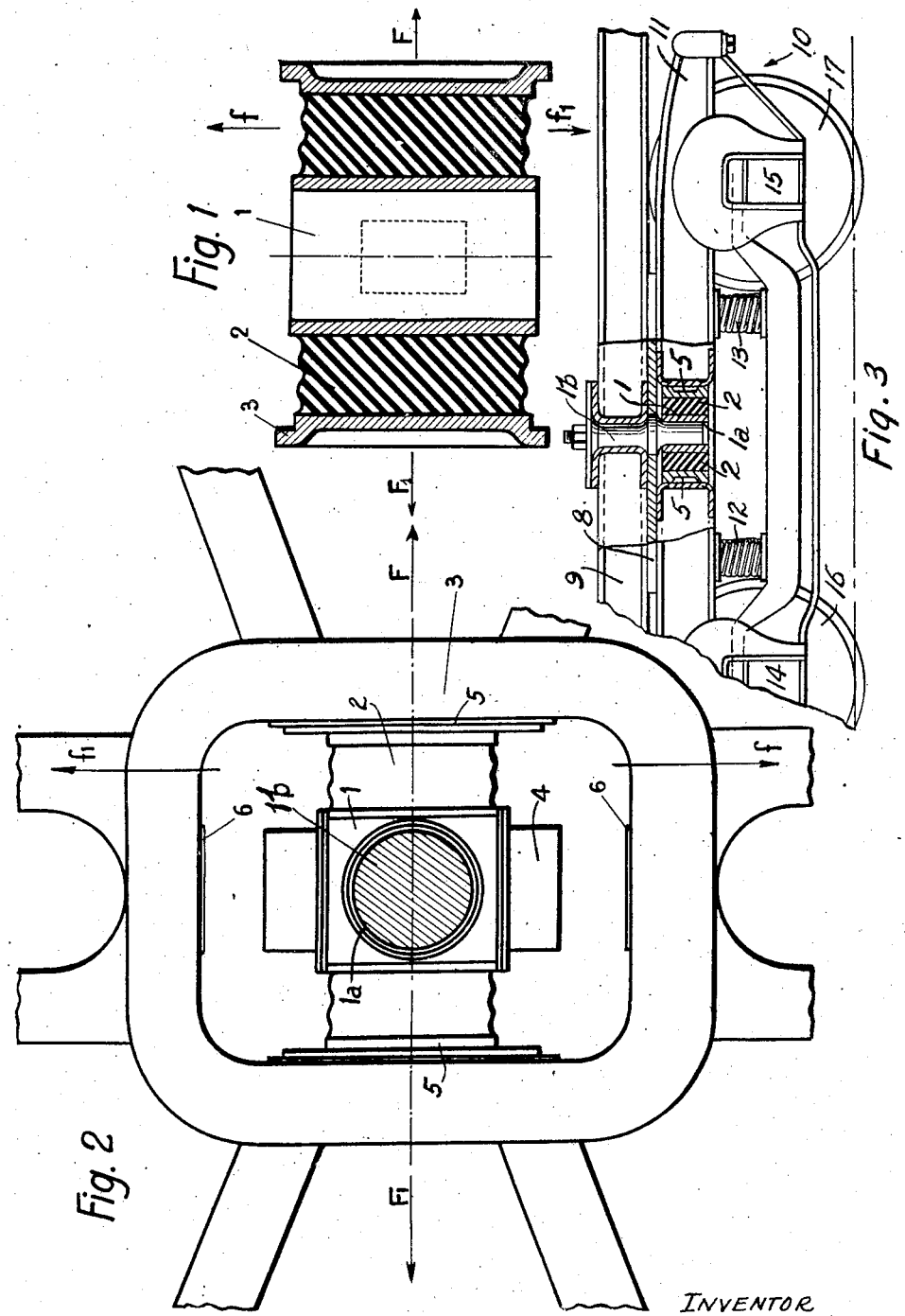

2,499,087

UNITED STATES PATENT OFFICE 2,499,087

ELASTIC PIVOT FOR RAILROAD AND THE LIKE VEHICLES

Pierre Marcel Bourdon, Paris, France, assignor to Manufacture de Caoutchouc Michelin (Puiseux, Boulanger & Cie), Clermont-Ferrand, France Application November 7, 1947, Serial No. 784,716
In France November 27, 1946

2 Claims. (Cl. 105—199)

1

The present invention has for its object a pivot for connecting a vehicle body to the rolling frame on which it is mounted. Said pivot is more particularly applicable to the connection between the body of a railroad vehicle and the bogies. However it is also applicable to any connections of the same type and in particular to road vehicles such as trailers, the front part of which rests on a tractor to which it is connected through a pivot. In the following disclosure, it will be supposed that the invention is applicable to the connection between a vehicle body and a bogie for railroads, although the invention is by no means limited to such an embodiment.

According to the invention, the pivot is carried by the frame of the bogie and is constituted by a rigid block provided with a bore for the vertical axis of the vehicle body, two surfaces of this rigid block that are arranged in opposite locations with reference to the direction of progression of the vehicle being connected to the bogie frame through the agency of rubber blocks of suitable shape, thickness and grade. Preferably rubber members arranged over the surfaces of the blocks that are perpendicular to those just mentioned provide for a limitation of the transversal displacement allowed by the first mentioned main rubber members in the exceptional cases where the latter displacement would be higher than the absorption capacity of the main rubber members.

Accompanying drawings show diagrammatically and by way of example a form of execution of the invention. In said drawings:

Fig. 1 is a vertical cross-section of the pivot alone.

Fig. 2 is a plan view of said pivot fitted in a bogie frame, and

Fig. 3 is a view in side elevation of a bogie truck supporting one end of the body frame of a railway vehicle, the pivot connection embodying the present invention being shown in section to disclose details thereof.

Different devices are known per se that serve for producing an elastic bearing of a vehicle frame on a bogie truck in the vertical direction. These devices including various springs are of course included. The pivot according to this invention is intended to absorb the lateral components of the stresses but is not submitted to the vertical stresses.

The invention will be described with reference to the connection between the body frame 9 of a vehicle, as shown in Fig. 3, and a bogie truck 10 having a truck frame 11 supported by means

2 of springs 12 and 13 and associated structure on the axles 14 and 15 and wheels 16 and 17 of the truck. As shown, the body frame 9 is supported on the truck frame 11 by means of a bearing plate or bolster 8 to permit turning of the truck relative to the frame 9. Any other conventional side bearing and bolster structure may be used instead of the bearing plate, if desired.

As apparent, the pivot according to the invention is constituted by a hub or rigid block 1 that may be made of steel, bronze or any like suitable material and is of a generally square or rectangular shape. At the center of said hub is formed a vertical bore 1a adapted to receive the pivot pin 1b fixed to the vehicle frame 9. The hub 1 is connected by members 2 of special rubber with the frame 3 of the bogie in the possible directions of progression of the vehicle as shown by the opposed arrows F—F1. These members are struck on the one hand to the corresponding opposed surfaces of the hub 1 and on the other hand to the cooperating plates 5 rigid with the frame 10 of the bogie. It is apparent that this arrangement allows a free axial displacement of the pivot pin 1b on the vehicle body inside the bore 1a together with free relative rotation of the bogie frame and vehicle body around the axis of the pivot pin 1b.

As to the horizontal stresses, whatever may be their direction, they are transmitted and damped by the rubber members 2 which latter show a low flexibility in the possible directions of progression of the vehicle F—F1 (Fig. 2). Consequently, the displacement of the vehicle frame with reference to the bogie are small in the said direction F—F1. In particular, the considerable stresses due to braking are absorbed by the two rubber members 2 of which one absorbs the tractional stresses and the other the compressional stresses, the extension or crushing of the rubber members being small. By reason of the properties of the rubber used for such members, the braking has a very gradual action on the vehicle frame.

The rubber members 2 provide also for the damping of the transversal stresses between the vehicle body and the bogie truck 10, that is, of the stresses that are exerted in the direction of the arrows f—f1. Any shocks of the bogie against any hindrances on the track as in the case of poorly executed connections, passage into and out of curves and the like are thus transmitted to the vehicle frame only after considerable damping. As a matter of fact, if the rubber members 2 have a rigidity that is comparatively high in the direction F, they are on the contrary highly deformable in the direction $f$ which allows a considerable damping in the latter direction. In order to brake any exaggerated transversal displacements that may be produced between the bogie and the vehicle frame by reason of the high transversal capacity of deformation of the rubber members 2, it is possible to make use of auxiliary arrangements for limiting gradually such transversal displacement, for instance through friction. Such arrangements are not described in detail nor illustrated as they lie within the reach of any person skilled in the art. Thus for instance it is possible to provide on the surfaces of the vehicle body and bogie frame facing one another, friction members that are not normally in contact with one another and that engage one another when said frame and body have executed a certain transversal displacement with reference to their normal location.

In order to limit positively the transversal displacements that may reach an exceptional value, for instance under the action of an extremely violent shock, e. g. in the case of a derailment for instance, there may be provided on the two surfaces of the hub 1 perpendicular to those carrying the rubber members 2, auxiliary members 4 adapted to abut in case of such exceptional transversal displacements against the members 6 carried by the bogie frame.

It should be noticed furthermore that under normal conditions the rubber members 2 produce the gradual return of the vehicle body to its normal position with reference to the bogie when it has been shifted away therefrom through the shocks suffered during progression and also the possibility for the bogie and vehicle body to assume with reference to one another a certain angular position without any rotation being required; the rubber members 2 provide also a perfect damping of all horizontal vibrations whatever may be their direction with reference to the axis F—F1.

What I claim is:

1. In a pivot connection for a railway vehicle having a bogie truck frame and a vehicle body frame; means for supporting the entire weight of the body frame directly on the truck frame, a frame portion in the top of the truck frame, said frame portion having a recess therein provided with substantially parallel inwardly facing walls on opposite sides thereof perpendicular to the direction of progression of said vehicle, a rigid bearing block in said recess and having a central bearing opening and substantially parallel outer surfaces facing said parallel walls, said bearing block being of smaller dimensions than said recess to permit movement of the bearing block in said recess in all directions, a pivot pin on said body frame rotatably engaging in said bearing block opening, separate resilient rubber blocks bonded to said parallel walls and to said outer facing surfaces of said bearing block, each rubber block being substantially coextensive in width and height with the surfaces of said bearing block to which it is bonded, and substantially narrower than the length of the wall to which it is bonded to permit movement of said bearing block and subject said rubber blocks only to non-vertical shearing stresses and only to non-vertical tension and compression stresses, said blocks constituting the sole means for cushioning the normal horizontal movements of said bearing block and pivot pin relative to said truck frame.

2. The pivot connection set forth in claim 1 comprising opposite inwardly facing walls in said recess spaced from said bearing block and extending substantially in the direction of progression of said vehicle, a pair of bumper elements fixed to opposite sides of said bearing blocks and extending outwardly therefrom toward the last-mentioned walls, the outer ends of said bumper elements being normally spaced from the last-mentioned walls and engageable therewith only upon extended movement of said bearing block transverse to the direction of progression of said vehicle.

PIERRE MARCEL BOURDON.

REFERENCES CITED

The following references are of record in the file of this patent:

UNITED STATES PATENTS

| Number | Name | Date |
|---|---|---|
| 1,810,718 | Lord | June 16, 1931 |
| 2,034,504 | Bugatti | Mar. 17, 1936 |
| 2,096,005 | Piron | Oct. 19, 1937 |

FOREIGN PATENTS

| Number | Country | Date |
|---|---|---|
| 486,270 | England | June 1, 1938 |